United States Patent [19]

Gnanou

[11] Patent Number: 5,346,956
[45] Date of Patent: Sep. 13, 1994

[54] PROCESS FOR MANUFACTURING MULTISEQUENCE STAR OR NETWORK POLYCONDENSATES BY DI- OR MULTI-ALDEHYDE COUPLING, AND POLYCONDENSATES OBTAINED

[75] Inventor: Yves Gnanou, Talence, France

[73] Assignee: Elf Atochem S.A., Puteaux, France

[21] Appl. No.: 2,818

[22] Filed: Jan. 11, 1993

[30] Foreign Application Priority Data

Jan. 10, 1992 [FR] France ................................. 92 00200

[51] Int. Cl.$^5$ ...................... C08L 33/04; C08L 61/00; C08K 5/07
[52] U.S. Cl. ..................................... 525/24; 525/156; 525/163
[58] Field of Search ........................... 525/94, 156, 163

[56] References Cited

U.S. PATENT DOCUMENTS 3,639,521  2/1972  Hsieh ..................................... 525/98
3,778,490  12/1973  Hsieh ..................................... 525/271

FOREIGN PATENT DOCUMENTS 0258065   3/1988   European Pat. Off.
2019473  11/1970   Fed. Rep. of Germany .
42-007633  3/1967   Japan .
44-011379  5/1969   Japan .

OTHER PUBLICATIONS

Polymer Preprints, vol. 29, No. 2, Sep. 1988 pp. 48–49, S. D. Smith, "Synthesis of Poly(methylmethacrylate) Macromonomers via Anionic Polymerization".

*Primary Examiner*—James J. Seidleck
*Assistant Examiner*—I. Zemel
*Attorney, Agent, or Firm*—Burns, Doane, Swecker & Mathis

[57] ABSTRACT

A novel process for coupling living polymers containing terminal (meth)acrylic units, which enables an increase in molecular weight and/or a defined multisequencing and/or a star structure with a defined number of branches, is disclosed. The disclosed process comprises the steps of: (i) anionic polymerization using an initiator system consisting of a functional initiator and a ligand to obtain a living polymer containing living terminal (meth)acrylics units; (ii) reacting it with an aldehyde compound of formula R—(CHO)$_r$ in which r≧2; and (iii) recovering the final polycondensate by means known per se.

50 Claims, No Drawings

PROCESS FOR MANUFACTURING MULTISEQUENCE STAR OR NETWORK POLYCONDENSATES BY DI- OR MULTI-ALDEHYDE COUPLING, AND POLYCONDENSATES OBTAINED

BACKGROUND OF THE INVENTION

The present invention relates to a novel process for producing polycondensates, and to polycondensates thus obtained.

Sequenced block polymers and copolymers, referred to hereunder as "block (co)polymers" containing acrylic or methacrylic units for which we shall use the generic term "(meth)acrylic" below, are of great importance and are widely used in industry. The properties that arise due to the presence of such blocks make them suitable for numerous applications; nevertheless, such applications are sometimes limited due to the low molecular weight of such block (co)polymers. Moreover, a perfectly defined structure, such as a star arrangement with a determined number of branches or a particular sequencing, in other words a particular topochemical structure, would enable such block (co)polymers to be endowed with other properties. Many efforts have been made to increase the molecular weight of block copolymers containing poly(meth)acrylate blocks, notably by coupling. Efforts have also been made to alter their sequencing to lead, for example, to tri-sequenced A—B—A polymers by coupling of bi-sequenced A—B polymers, these latter being difficult to obtain directly, or to polymers having a star structure. Attempts have thus been made to couple polymers A, or A—B, A—B—A, A—B—C etc. copolymers, in order to obtain block (co)polymers of type A—A, A—B—B—A, A—B—A—A—B—A, A—B—C—C—B—A, etc. as well as star (co)polymers.

Coupling is a known technique for certain polymers such as for example, polystyrene and polybutadiene. In this case, dialdehydes are employed as coupling agents, following reaction between a carbanionic species and the carbonyl group. For other units, a great variety of techniques, coupling agents, and, in certain cases crosslinking agents, exist.

Numerous polymerisation techniques, notably for (meth)acrylic units, have been developed during recent years. Among these, group transfer polymerisation (GTP) should be mentioned. This technique leads to "living" polymers being obtained, in other words carrying an anionic termination which is hence highly reactive, enabling functionalised polymers to be prepared- which can be coupled using a diisocyanate, along with polymers of a defined structure. Nevertheless, this technique suffers from the disadvantage of requiring preliminary synthesis of silylketene acetal as an initiator, and GTP cannot be applied to synthesis of sequenced copolymers containing non-(meth)acrylic sequences.

S. D. Smith in Polymer Preprints, vol. 29, No. 2, 1988, LN 3776, pp. 48-49 describes the reaction between the carbanion termination of a methacrylic unit and an aldehyde group. This reaction between "living" methacrylic anions and benzaldehyde is highly selective and leads to O—, —OH terminations, in other words functionalised terminations.

French Patent 2 469 400 discloses star copolymers and the process for obtaining them. The "branches" or arms of the star are formed by copolymers containing at least one block of (meth)acrylic units and are linked to a core constituted by a multifunctional cross-linking agent. This agent can notably be selected from polyol poly(meth)acrylates. Unfortunately, the number of branches is not controlled, and the resulting product does not have the required properties.

French Patent Application serial number 90 1724 describes functionalised multisequenced polymers and their production. These polymers contain poly(meth)acrylate blocks and are functionalised at their terminations. There is no mention of coupling in this patent application. Thus, the process described therein, when carried out in order to obtain high molecular weights or a predetermined tri-sequencing by direct synthesis, leads to considerable increase in manufacturing costs.

SUMMARY OF THE INVENTION

The present invention provides a novel process for coupling polymers containing terminal (meth)acrylic units enabling an increase in molecular weight and/or a defined multi-sequencing and/or a star structure with a defined number of branches to be readily and economically obtained. None of the patents or patent applications mentioned above teaches nor suggests such a process. The present invention hence provides a process for coupling a living polymer containing living terminal (meth)acrylic units comprising the steps of:

(i) anionic polymerisation using an initiator system consisting of a functional initiator and a ligand in order to obtain a living polymer containing living terminal (meth)acrylics units;

(ii) reacting it with an aldehyde compound of formula:

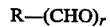

in which $r \geq 2$; and, (iii) recovering the final polycondensate by means known per se.

The expression "living polymer" as employed in this present specification means a polymer at least one termination of which is an anionic (or "living") termination of a (meth)acrylic monomer, in other words:

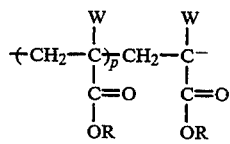

where W=H or Me.

This polymer is designated below by P— or —P— meaning respectively a mono-anionic or di-anionic polymer, depending on whether it has one or two living terminations.

The polymer consists preferably of monomer units selected from the group comprising acrylic, methacrylic, vinylaromatic, dienic, vinylpyridines, alkylene oxides, lactames, lactones and maleimides monomers.

The expression "(meth)acrylic monomer" as employed in this specification means a monomer selected from: alkyl methacrylate, mono- and di-alkylmethacrylamide, alkylthioalkyl or alkoxylamid methacrylate, methacrylonitrile, alkyl acrylate, mono- and di-alkylacrylamide, alkylthioalkyl or alkoxylamid acrylate, and acrylonitrile. The linear or branched alkyl group contains 1 to 18 carbon atoms. It can be unsubstituted or substituted with one or several groups selected from halide such as chlorine or fluorine. Nonlimiting examples are: methyl, ethyl, 2,2,2-trifluoroethyl, n-propyl, isopropyl, n-butyl, sec-butyl, tert-butyl, n-amyl, i-amyl, i-octyl, nonyl, decyl, lauryl, stearyl, glycidyl, isobornyl, norbornyl, phenyl (meth)acrylates, among others. The preferred acrylic monomer is ter-butyl acrylate, the poly ter-butylacrylate block being referred to below as PtBuA. The preferred methacrylic monomer is methyl methacrylate, the polymethylmethacrylate block being referred to below as PMMA.

The expression "vinylaromatic monomer" as employed in this present specification means an ethylenically unsaturated aromatic monomer. Non-limiting examples are styrene, vinyl toluene, alphamethylstyrene, methyl-4-styrene, methyl-3-styrene, methoxy-4-styrene, hydoxymethyl-2-styrene, ethyl-4-styrene, ethoxy-4-styrene, dimethyl-3,4-styrene, chloro-2-styrene, chloro-3-styrene, chloro-4-methyl-3-styrene, tert-butyl-3-styrene, dichloro-2,4-styrene, dichloro-2,6-styrene, vinyl-1-naphthalene, among others. The preferred monomer is styrene, the polystyrene block being referred to below as PS.

The expression "dienic monomer" as employed in this present specification means a diene selected from linear or cyclic, conjugated or non-conjugated dienes having 1 to 20 carbon atoms. Non-limiting examples are: butadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5 -ethylene-2-norbornene, 5-(2-propenyl)-2-norbornene, 5 -(5-hexenyl)-2-norbornene, 1,5-cyclo-octadiene, bicyclo[2,2,2]octa-2,5-diene, cyclopentadiene, 4,7,8,9-tetrahydroindene, isopropylidene, tetrahydroindene among others. The preferred monomer is butadiene, the polybutadiene block being referred to below as PBut.

The expression "alkylene oxides" as employed in this specification means alkylene groups containing 1 to 6 carbon atoms and carrying an epoxy function. Examples are: ethylene oxide, propylene oxide.

The expressions "lactames and lactones" as employed in this specification respectively mean cyclic internal amides and esters having 4 to 12 carbon atoms. Examples are caprolactame and caprolactone.

The expression "vinylpyridines" as employed in this specification means a pyridine group carrying an ethylenically unsaturated substituent. The ethylenically unsaturated substituent, for example a vinyl group, can be at position 2, 3 or 4 on the pyridine cycle. The substituent, in the same way as the pyridine cycle, can be unsubstituted or substituted with one or several groups selected from: $C_{1-4}$ alkyl, hydroxy, $C_{1-4}$ hydroxyalkyl, $C_{1-4}$ alkoxy, halogen, preferably chlorine. Examples are: 2-, 3- or 4-vinylpyridine, 2-, 3- or 4-(α-methylvinyl)pyridine, 4 -ethyle-2- or 3-vinylpyridine, 2,6-dichloro-4-vinylpyridine, 3-, 4- or 5-(α-methylvinyl)pyridine. Preferred monomers are 2-vinylpyridine and 4-vinylpyridine, these blocks being referred to below as P2VP, P4VP, respectively.

The expression "maleimides" as employed in the present specification means an unsubstituted or N-substituted maleimide monomer of formula:

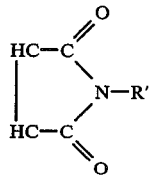

in which R' is an alkyl, arylalkyl, aryl or alkylaryl radical with 1 to 12 carbon atoms.

Examples of such monomers are notably: N-ethylmaleimide, N-isopropylmaleimide, N-n-butylmaleimide, N-isobutylmaleimide, N-terbutylmaleimide, N-n-octylmaleimide, N-cyclohexylmaleimide, N-benzylmaleimide and N-phenylmaleimide. The preferred maleimide is N-cyclohexylmaleimide, this block being referred to by NCHMI.

Following step (i), the "living" polymer can be monoor bi-anionic, respectively P⁻ or ⁻P⁻, in other words having one or two reactive terminations. The reactive terminations are the termination of blocks consisting of (meth)acrylic monomer. The living polymer can be made up by one, two, three or several blocks. Depending on whether the initiator is mono- or bi-functional, the living polymer is P⁻ or ⁻P⁻, respectively.

These living P⁻ or ⁻P⁻ polymers react, according to the process of the present invention, with compounds carrying at least two aldehyde functions, leading to polycondensates. These compounds carrying at least two aldehyde functions can be di- or multi-functional.

In the case of di-aldehydes, the living polymers reacts according to the process of the present invention with said di-aldhydes, leading, by coupling, to polycondensates of higher molecular weight of substantially linear structure. Molecular weight is substantially doubled in the case of mono-anionic living polymers. In the case of di-anionic living polymers, the molecular weight is multiplied by a factor the value of which can be accurately controlled, and is typically comprised between 5 and 10.

In the case of multi-aldehydes bearing r functions, the polycondensates obtained finally are of two natures, depending on the nature of the starting living polymer. If the starting living polymer is mono-anionic, the final polycondensate obtained according to the process of the invention will have substantially a star structure with r arms or branches. If the starting living polymer is bi-anionic, the final polycondensate final obtained by the process of the invention will have a network structure.

According to a first embodiment of the present invention, the process comprises the steps of:

(i) anionic polymerisation of a (meth)acrylic monomer A using an initiator system comprising at least one monofunctional initiator and at least one ligand leading to the living polymer $(A)_a^-$, $a \leq 5\ 000$;

(ii) reaction thereof with an aldehyde compound of formula:

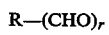

in which $r \geq 2$; and (iii) recovering the final polycondensate by means known per se.

According to this first embodiment of the invention, coupling by a dialdehyde increases molecular weight and coupling with a multi-aldehyde leads moreover to a star polymer of formula $[(A)_a]_rR$, the standard deviation of r ($\sigma r$) being extremely small.

The living polymer $(A)_a^-$ has an average molecular weight of (1 000) to (500 000), preferably (2 000) to (300 000). The living polymer $(A)_a^-$ can be:
- of the acrylic type, preferably polytert-butylacrylate (PtBuA$^-$);
- of the methacrylic type, preferably polymethylmethacrylate (PMMA$^-$).

According to a second embodiment of the invention, the process comprises the steps of:

(i) (a) anionic polymerisation of a monomer A selected from the group consisting of (meth)acrylic, vinylaromatic, dienic, vinylpyridine, alkylene oxides, lactames, lactones and maleimides monomers, using an initiator system consisting of at least one monofunctional initiator and at least one ligand leading to the living polymer $(A)_a^-$, a being $\leq 5\,000$; and (b) reacting said living polymer $(A)_a^-$ with a monomer B (meth)acrylic different from A, in the presence of at least one ligand as defined above, leading to the bi-sequenced polymer $(A)_a$—$(B)_b^-$, with $b \leq 5\,000$;

(ii) reacting the $(A)_a$—$(B)_b^-$ living polymer with an aldehyde compound of formula:

$$R-(CHO)_r$$

in which $r \geq 2$; and (iii) recovering the final polycondensate by means known per se.

According to this second embodiment, coupling by dialdehyde not only enables molecular weight to be increased, but also provides a way of obtaining symmetrical tri-sequenced copolymers very easily and economically. Actually, direct synthesis of a tri-sequenced block polymer of the type $(A)_a$—$(B)_b$—$(A)_a$, where B is a (meth)acrylic sequence, A being different from B (but being able to be a different (meth)acrylic sequence), is difficult and expensive. The present invention hence provides a process comprising the steps of:
- polymerisation to $(A)_a^-$
- polymerisation to $(A)_a$—$(B)_{b/2}^-$
- coupling to $(A)_a$—$(B)_{b/2}$—R—$(B)_{b/2}$—$(A)_a$, or when neglecting the body carrying the two functions originated from the aldehyde compound is neglected, to $(A)_a$—$(B)_b$—$(A)_a$.

Moreover, it is also possible to obtain star polymers of formula $[(A)_a$—$(B)_b]_rR$, the number of branches also being constant.

The molecular weights of sequences $(A)_a$ and $(B)_b$ are comprised between 1 000 and 500 000, preferably between 2 000 and 300 000. Monomers A and B can be present, by weight, in ratios of $(A)_a/(B)_b$ from 1/500 to 500/1, preferably 1/99 to 99/1, advantageously 5/95 to 95/5. The living polymer $(A)_a$—$(B)_b^-$ can for example be:
methacrylic/acrylic,
vinylaromatic/(meth)acrylic,
dienic/(meth)acrylic,
vinylpyridine/(meth)acrylic,
(meth)acrylic/maleimide,
(meth)acrylic/alkylene oxide.

Preferably, monomer A is selected from the vinylaromatics, monomer B is selected from the methacrylates.
Specific examples are:
PS/PMMA$^-$,
PS/PtBuA$^-$,
PtBuA/PMMA$^-$,
P4VP/PMMA$^-$,
PMMA/PtBuA$^-$.

Similarly, according to a third embodiment of the present invention, the process comprises the steps of:

(i) (a) anionic polymerisation of a monomer A selected from the group consisting of (meth)acrylic, vinylaromatic, dienic, vinylpyridine, alkylene oxides, lactames, lactones and maleimides monomers, using an initiator system consisting of at least one monofunctional initiator and at least one ligand leading to the living polymer $(A)_a^-$, with a $\leq 5\,000$;

(b) reacting said living polymer $(A)_a^-$ with a monomer B different from A, selected from the group consisting of (meth)acrylic, vinylaromatic, dienic, vinylpyridines, alkylene oxides, lactames, lactones and maleimides monomers, in the presence of at least one ligand as defined above, leading to the polymer $(A)_a$—$(B)_b^-$, with $b \leq 5\,000$;

(c) reacting Said living $(A)_a$—$(B)_b^-$ polymer with a (meth)acrylic monomer C different from B, in the presence of at least one ligand as defined above, leading to the living tri-sequenced copolymer $(A)_a$—$(B)_b$—$(C)_c^-$, with $c \leq 5\,000$;

(ii) reacting $(A)_a$—$(B)_b$—$(C)_c^-$ with an aldehyde compound of formula $R(CHO)_r$ in which $r \geq 2$; and (iii) recovering the final polycondensate by means known per se.

The advantages are substantially identical to those obtained for the bi-sequenced homopolymers and polymers.

The molecular weights of sequences $(A)_a$, $(B)_b$ and $(C)_c$ are comprised between 1/500/500 and 500/1/1, preferably 1/100/100 and 100/1/1. Monomers A, B and C can be present in a weight ratio $(A)_a/(B)_b/C_{(c)}$ comprised between 1/500/500 and 500/1/1, preferably 1/100/100 and 100/1/1. Living polymer $(A)_a$—$(B)_b$—$(C)_c^-$ can for example be:
methacrylic/acrylic/methacrylic,
vinylaromatic/acrylic/methacrylic,
dienic/acrylic/methacrylic,
vinylaromatic/methacrylic/acrylic,
acrylic/methacrylic/acrylic,
vinylaromatic/dienic/(meth)acrylic,
dienic/vinylaromatic/(meth)acrylic.

Preferably, polymer A is selected from the vinylaromatics, monomer B from the vinylpyridines, monomer C from the methacrylates.
Specific examples are:
PS/P2VP/PMMA$^-$,
PS/PtBuA/PMMA$^-$,
PMMA/PtBuA/PMMA$^-$,
PtBuA/PMMA/PtBuA$^-$,
PS/PMMA/PtBuA$^-$,
PS/PBut/PMMA$^-$,
PBut/PS/PMMA$^-$.

The present invention is not limited to a tri-sequenced polymers and can in fact be applied to any multi-sequenced polymer the general formula for which P$^-$ can be developed to give:

$$(A)_a—(B)_b—(C)_c—\ldots—(K)_k—\ldots$$

each one of monomers A, B, C, . . . , K, . . . being pairwise consecutively different and each integer a, b, c, . . . , k, . . . being comprised between 0 and 5 000.

According to a fourth embodiment of the present invention, the process comprises the steps of:

(i) (a) anionic polymerisation of a monomer A selected from the group consisting of (meth)acrylic, vinylaromatic, -dienic, vinylpyridine, alkylene oxides, lactames, lactones and maleimides monomers, using an initiator system consisting of at least one monofunctional initiator and at least one ligand leading to the living polymer $(A)_a^-$, $a \leq 5\,000$;

(b) reacting said living polymer $(A)_a^-$ with a monomer B different from A, selected from the group consisting of (meth)acrylic, vinylaromatic, dienic, vinylpyridines, alkylene oxides, lactames, lactones and maleimides monomers, in the presence of at least one ligand as defined above, leading to the polymer $(A)_a$—$(B)_b^-$, $b \leq 5\,000$;

(c) reacting said living $(A)_a$—$(B)_b^-$ polymer with a monomer C different from B, selected from the group consisting of (meth)acrylic, vinylaromatic, dienic, vinylpyridines, alkylene oxides, lactames, lactones and maleimides monomers, in the presence of at least one ligand as defined above, leading to the living tri-sequenced copolymer $$(A)_a - (B)_b - (C)_c^-, \text{ with } c \leq 5000;$$
.
.
.

(k) reacting said $(A)_a$—$(B)_b$—$(C)_c$—...—$(J)_j^-$ with a monomer K different from J, selected from the group consisting of (meth)acrylic, vinylaromatic, dienic, vinylpyridines, alkylene oxides, lactames, lactones and maleimides monomers, in the presence of at least one ligand such as defined above leading to the living tri-sequenced polymer $$(A)_a - (B)_b - (C)_c^- \ldots - (K)_k^-, \text{ with } k \leq 5000;$$
.
.
.

and finally reacting the living polymer obtained from the previous step with a (meth)acrylic monomer in the presence of at least one ligand leading to a living polymer $P^-$, and (ii) reacting said polymer $P^-$ with an aldehyde compound of formula $R(CHO)_r$ in which $r \geq 2$; and (iii) recovering the final polycondensate by means known per se. According to a fifth embodiment of the present invention, the process comprises the steps of:

(i) anionic polymerisation of a (meth)acrylic monomer A using an initiator system comprising at least one bi-functional initiator and at least one ligand leading to the living polymer $^-(A)_a^-$, with $a \leq 5\,000$.

(ii) reacting said living polymer $^-(A)a$ with a di- or multi-aldehyde compound; and (iii) recovering the final polycondensate by means known per se.

Just like the case of $(A)_a^-$ living polymers, the final polycondensate has a substantially higher molecular weight. As opposed to this, with a reaction with a multialdehyde, the final polycondensate has a network structure.

The $^-(A)_a^-$ living polymer has an average molecular weight of (1 000) to (500 000), preferably (2 000) to (300 000). The $^-(A)_a^-$ living polymer can be:
acrylic, preferably poly-tert-butylacrylate $(^-PtBuA^-)$;

methacrylic, preferably polymethylmethacrylate $(^-PMMA^-)$. According to a sixth embodiment of the invention, the process comprises the steps of:

(i) (a) anionic polymerisation of a monomer A selected from the group consisting of (meth)acrylic, vinylaromatic, dienic, vinylpyridine, alkylene oxides, lactames, lactones and maleimides monomers, using an initiator system consisting of at least one bi-functional initiator and at least one ligand leading to the living polymer $^-(A)_a^-$, with a $\leq 5\,000$;

(b) reacting said living polymer $^-(A)_a^-$ with a (meth)acrylic monomer B different from A, in the presence of at least one ligand as defined above, leading to the polymer $^-(B)_b$—$(A)_a$—$(B)_b^-$, with $\leq 5\,000$;

(ii) reacting said living polymer $^-(B)_b$—$(A)_a$—$(B)_b^-$, with aldehyde compound of the formula $R(CHO)_r$; and (iii) recovering the final polycondensate by means known per se.

The advantages are substantially identical to those obtained in the previous cases, regarding increase of molecular weight, etc.

One interesting application concerns coupling with a dialdehyde. Step (i) is implemented in order to obtain a living polymer $^-P^-$ of formula:

$$^-(B)_{b/2}\text{—}(A)_a\text{—}(B)_{b/2}^-$$

This living polymer reacts with the di-aldehyde, leading to the formation of a bi-sequenced polymer:

$$\ldots\\ \text{—}(B)_{b/2}\text{—R—}(B)_{b/2}\text{—}(A)_a\text{—}(B)_{b/2}\text{—R—}(B)_{b/2}\text{—}(A)_a\text{—}(B)_{b/2}\text{—R—}(B)_{b/2}\text{—}\ldots$$

in other words, if we consider R to be negligible compared to $(B)_b$, to the following high molecular weight bi-sequenced product: $[(A)_a\text{—}(B)_b]_x$.

The molecular weights of sequences $(A)_a$ and $(B)_b$ are comprised between 1 000 and 500 000, preferably between 2 000 and 300 000. Monomers A and B can be present in weight ratios of $(B)_b/(A)_a/(B)_b$ from 49/2/49 to 1/98/1, preferably 10/45 to 5/90/5. Living polymer $(B)_b$—$(A)_a$—$(B)_b^-$ can for example be:
methacrylic/acrylic/methacrylic,
(meth)acrylic/vinylaromatic/(meth)acrylic,
(meth)acrylic/dienic/(meth)acrylic,
acrylic/methacrylic/acrylic.
Preferably, monomer A is selected from the vinylaromatics, monomer B being selected from the (meth)acrylates. Specific examples are:
PMMA/PS/PMMA$^-$,
PtBuA/PS/PtBuA$^-$,
PMMA/PtBuA/PMMA$^-$,
PtBuA/PMMA/PtBuA$^-$,
PMMA/PBut/PMMA$^-$.

According to a seventh embodiment of the invention, the process comprises the steps of:

(i) (a) anionic polymerisation of a monomer A selected from the group consisting of (meth)acrylic, vinylaromatic, dienic, vinylpyridine, alkylene oxides, lactames, lactones, maleimides monomers, using an initiator system consisting of at least one bifunctional initiator and at least one ligand leading to the living polymer $^-(A)_a^-$, with a $\leq 5\,000$;

(b) reacting said living polymer $^-(A)_a^-$ with a monomer B different from A, selected from the group consisting of (meth)acrylic, vinylaromatic, dienic, vinylpyridines, alkylene oxides, lactames, lactones and maleimides monomers, in the presence of at least one ligand as defined above, leading to the polymer $^-(B)_b$—$(A)_a$—$(B)_b^-$, with $b \leq 5\,000$;

(c) reacting said living $^-(B)_b$—$(A)_a$—$(B)_b^-$ polymer with a (meth)acrylic monomer C different from B, in the presence of at least one ligand as defined above, leading to the living tri-sequenced copolymer $^-(C)_c$—$(B)_b$—$(A)_a$—$(B)_b$—$(C)_c^-$, with $c \leq 5\,000$;

(ii) reacting this living polymer with aldehyde compound of the formula $R(CHO)_r$, $r \geq 2$; R and (iii) recovering the final polycondensate by means known per se.

Similarly, with a dialdehyde, the final polycondensate is a multisequenced product of formula $[(C)_c$—$(B)_b$—$(A)_a$—$(B)_b$—$(C)_c]_x$.

Advantageously, monomer A is selected from the vinylaromatics, monomer B is selected from the vinylpyridines, monomer C is selected from the (meth)acrylates.

The molecular weights of sequences $(A)_a$, $(B)_b$ and $(C)_c$ are comprised between 1 000 and 500 000, preferably between 2 000 and 300 000.

The present invention is not limited to a symmetrical polymer having 3 blocks, and in fact applies to any multisequenced polymer the general formula of which $^-P^-$ can be developed to give:

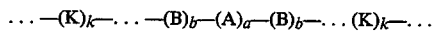

each one of the monomers A, B, . . . , K, . . . being pairwise consecutively different and each one of integers a, b, . . . , k, . . . being less than 5 000.

According to an eighth embodiment of the invention, the process comprises the steps of:

(i) (a) anionic polymerisation of a monomer A selected from the group consisting of (meth)acrylic, vinylaromatic, dienic, vinylpyridine, alkylene oxides, lactames, lactones and maleimides monomers, using an initiator system consisting of at least one bi-functional initiator and at least one ligand leading to the living polymer $^-(A)_a^-$, $a \leq 5\,000$;

(b) reacting said living polymer $^-(A)_a^-$ with a monomer B different from A, selected from the group consisting of (meth)acrylic, vinylaromatic, dienic, vinylpyridines, alkylene oxides, lactames, lactones and maleimides monomers, in the presence of at least one ligand, leading to the living polymer $$^-(B)_b\ ^-(A)_a - (B)_b^-,\ b \leq 5000;$$

.
.
.

(k) reacting said $^-(J)_j$—$(B)_b$—$(B)_b$—. . . —$(J)_j^-$ polymer with a monomer K different from J, selected from the group consisting of (meth)acrylic, vinylaromatic, dienic, vinylpyridines, alkylene oxides, lactames, lactones and maleimides monomers, in the presence of at least one ligand leading to the living symmetrical polymer

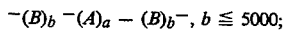

.
.
.

and finally reacting the living polymer obtained from the previous step with a (meth)acrylic monomer in the presence of at least one ligand leading to a living polymer $^-P^-$;

(ii) reacting said polymer $^-P^-$ with an aldehyde compound of formula $R(CHO)_r$, with $r \geq 2$; and (iii) recovering the final polycondensate by means known per se.

Depending on which final polycondensate it is desired to obtain, the aldehyde compound is a di- or multi-aldehyde.

Living polymers suitable for use in the process of the present invention are many varied. They can be homopolymers of (meth)acrylates, and bi- or tri-sequenced copolymers. The tri-sequenced polymers can be made up blocks A, B and C which are all different, or in which units of blocks A and C are identical, B being different from A. In this latter case, the blocks can have identical molecular weights (the trisequenced polymer is symmetrical) or different molecular weights, depending on the polymerisation process (i) employed.

The group R carrying the aldehyde functions can be an alkyl, cycloalkyl, aryl, aralkyl group, containing 2 to 24 carbon atoms unsubstituted or substituted with one or several substituents selected from the group comprising: $C_{1-6}$ alkyl $C_{1-6}$ alkoxy or $(C_{1-6})$ dialkyl amino, halogen, trifluoromethyl among others.

Group R carrying the aldehyde functions is preferably an aryl group, unsubstituted or substituted with 1 to 4 groups selected from $C_{1-4}$ alkyl, trifluoromethyl, halogen. Examples of aldehyde compounds are: 1,6-naphthalaldehyde, isophthalaidehyde, terephthalaldehyde, 1,3,5-triformylbenzene. Particularly preferred aldehyde compounds are terephthalaldehyde and 1,3,5-triformylbenzene.

The aldehyde compound may be bi-functional, r being equal to 2, or alternatively it may be multi-functional, r being higher than 2.

Steps (i) and (ii) of the process are carried out as a function of the monomers and reagents added, and of what type of final polycondensate it is desired to obtain.

According to one embodiment of the process, the reactions of steps (i) and (ii) are carried out in the presence of at least one solvent selected from aromatic solvents such as benzene, toluene, or solvents such as tetrahydrofuran (THF), diglyme, tetraglyme, orthoterphenyl, biphenyl, decaline, tetraline or dimethylformamide. Preferred solvents are THF or toluene.

The reaction temperature of steps (i) and (ii) can vary between about $-100°$ C. and $60°$ C., preferably between about $-80°$ C. and $20°$ C.

According to one embodiment the reactions of steps (i) and (ii) of the process are carried out in the absence of oxygen and water in an anhydrous and aprotic medium.

The amount of di- or multi-aldehyde introduced is such that the aldehyde/monofunctional initiator and aldehyde/bifunctional initiator ratios are comprised, respectively, in the ranges (0.2)-(10) and (0.2)-(10). Preferably, the ranges are (0.5)-(1) and (0.5)-(2) respectively.

Advantageously, the aldehyde compound is introduced in a substantially stoichiometric amount with respect to the mono- or bi-functional initiator. In accordance with this embodiment, the molar amount of aldehyde function is substantially equal to that of monofunctional initiator, and substantially double that of bi-functional initiator.

In polymerisation step (i) of the process according to the invention, the amount of ligand employed can vary widely with respect to the mono- or bi-functional initiator. The amount can for example be largely in excess of the molar amount of initiator. This amount can also be equal too or less than the molar amount of initiator. The amount is at least equal to 0.3 and can be up to about 50. Preferably, the ligand is introduced in an amount that is 5 times molar with respect to the initiator.

The mono-functional initiator employed in the first polymerization step (i) of the process is selected from compounds formula:

in which:
M is an alkaline or alkaline-earth metal of a valency of 1; and
R' is a straight chain or branched alkyl radical with 2 to 6 carbon atoms or an optionally substituted aryl radical, or an alkyl radical with 1 to 6 carbon atoms substituted by at least one phenyl group; and compounds of the formula:

$(C_6H_5)_2CHM'$ in which:
M' is selected from lithium, sodium and potassium.

Such mono-functional initiators are, for example, selected from the group comprising: sec.-butyllithium, n-butyllithium, fluorenyllithium, alphamethylstyryllithium, 1,1-diphenylhexyllithium (DPHLi), diphenylmethyl-lithium or -sodium or -potassium and 1,1-diphenyl-3-methylpentyllithium.

The preferred mono-functional initiator is DPHLi.

The bi-functional initiator employed in the first polymerization step (i) of the process is selected from compounds of the formula:

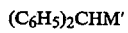

in which:
M is an alkaline or alkaline-earth metal of a valency of 2; and
R' is a straight chain or branched alkyl radical with 2 to 6 carbon atoms or an optionally substituted aryl radical, or an alkyl radical with 1 to 6 carbon atoms substituted by at least one phenyl group; and compounds of the formula:

$(C_{10}M_6)M'_2$ in which:
M' is selected from lithium, sodium and potassium.

The bi-functional initiator can be selected from compounds such as 1,1,4,4-tetraphenyl-l,4-dilithio-butane (TPDLB), 1,1,4,4-tetraphenyl-l,4-disodiobutane, naphthalene lithium, naphthalene sodium, naphthalene potassium and homologues thereof.

Preferred bi-functional initiators are TPDLB and naphthalene lithium.

Said ligand can be selected for the one part from alkaline or alkaline-earth mineral salts such as chlorides, fluorides, bromides, iodides, borides, sulfates, nitrates and borates, and, for the other part, from alkaline metal organic salts, such as alcoholates, carboxylic acid esters substituted in the alpha by said metal, and salts in which said alkaline is associated with a group such as:

(A) groups of formula:

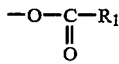

in which $R_1$ is a straight chain or alkyl radical with 1 to 20 carbon atoms, or a cycloalkyl radical with 3 to 20 carbon atoms, or an aryl radical with 6 to 14 carbon atoms;

(B) groups of formula:

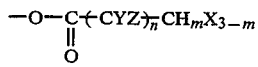

in which:
Y and Z, which may be the same or different, are selected from hydrogen and halogen atoms;
n is an integer from 0 to 4;
X is a halogen atom; and
m is an integer from 0 to 2;

(C) groups of formula:

$$-O-SO_2-CT_3 \qquad (IV)$$

in which:
T is selected from hydrogen and halogen atoms; and (D) groups of formula:

$$-B(R_2)_4 \qquad (V)$$

in which:
$R_2$ is selected from hydrogen, and alkyl and aryl radicals.

Examples of groups of formula (II) are acetate, propionate and benzoate groups, examples of groups of formula (III), are α-bromoacetate and trifluoroacetate groups, and of groups of formula (IV) are trifluoromethanesulfonic and methanesulfonic groups, and of groups of formula (V), borohydrate and tetraphenylborate groups.

Said ligand can also consist of a non-nitrogeneous macrocyclic complexing agent, selected from cyclic polyethers and polythioethers, such as macrocyclic poly(thio)ethers having a macrocyclic ring containing at least 14 carbon atoms and oxygen, each oxygen atom of the ring being separated from the other oxygen atoms of the ring by two or three carbon atoms; such macrocyclic polyethers have already been described in U.S. Pat. Nos. 3 687 978 and 4 826 941.

Such ligands are described in French patent application serial no. 90.1724. The preferred ligand is LiCl and those stated in the above French patent application.

The final polycondensate is recovered from the reaction medium by separation using conventional techniques known to those skilled in the art. Preferably, the polycondensate is separated by precipitation in a solvent or solvent mixture such as: heptane, methanol, methanol/water. Separation is advantageously done by precipitation in a cold methanol/water mixture.

After coupling step (ii), a physical gel is able to form resulting from association between alcoholate functions, characterized by an increase in viscosity.

According to one embodiment of the invention, the total amount of the aldehyde compound is added before the medium gels. In another embodiment, the aldehyde compound is introduced dropwise.

In one embodiment, the medium is acidified prior to separation (by precipitation). The acidifying agent can be any acid, for example: hydrochloric, sulfuric, acetic, paraor methane-toluenesulfonic acid, if necessary, in a solvent, for example water, THF, toluene, methanol, and preferably methanol or THF.

In one alternative embodiment of the invention the blocks representing an acrylic and/or methacrylic monomer sequence, as defined above, can be totally or partially hydrolysed, to the corresponding acrylic and/or methacrylic acid sequence and said corresponding acrylic and/or methacrylic acid sequence can, if needed be subsequently totally or partially saponified with an alkaline or alkaline-earth metal salt to a corresponding alkaline or alkaline-earth acrylate and/or methacrylate sequence.

According to another alternative embodiment of the invention, the blocks representing an acrylic and/or methacrylic monomer sequence as defined above, can be totally or partially transesterified to a sequence of another acrylic and/or methacrylic monomer, in .order to replace tertiary (meth)acrylate by a secondary (meth-)acrylate or vice-versa, a secondary (meth)acrylate by a primary (meth)acrylate or vice-versa, a tertiary (meth-)acrylate by a primary (meth)acrylate or vice-versa.

The present invention also covers polycondensates obtained by the present process.

The examples given below are for the purpose of illustrating the present invention and should not be considered as limiting it.

EXAMPLE 1

Polycondensate Obtained by Reacting a Mono-functional "Living" Poly(t-BuA) with Terephthaldehyde Characteristic of poly(t-BuA)
mono-functional precursor ... $\overline{M}n = 12\,000$ g/mole 12.5 ml of a solution of diphenylhexyl lithium were introduced into 300 ml of anhydrous THF containing 0.7 g of LiCl ($1.65.10^{-2}$ moles) previously vacuum dried, at a concentration of $0.12.10^{-3}$ moles/ml, equivalent to $1.5.10^{-3}$ mole. The medium was brought down to $-80°$ C. 18 g of tert-butyl acrylate solution in THF were then introduced dropwise into the reaction medium. When polymerisation of the monomer was finished, the terephthalaldehyde (0.1 g equivalent to $7.5.10^{-4}$ moles) in solution in THF—in an amount of 0.1 g in 40 ml of THF—was added. The medium was then brought up to ambient temperature; before cold precipitation using a methanol-water mixture (90/10), the polymer was neutralised by adding acidic methanol. The numeric molar mass of the sample obtained was $\overline{M}n = 21\,500$ g/mole.

EXAMPLE 2

Polycondensate Obtained by Reacting a Bi-functional Living Poly(t-BuA) with Terephthalaldehyde Characteristic of poly(t-BuA)
di-anionic precursor ... $\overline{M}n = 15\,000$ g/mole 3.4 ml of a solution of 1,1,4,4-tetraphenyldilithiobutane in THF were introduced at a rate of $0.44.10^{-3}$ moles/ml, equivalent to $15.10^{-3}$ mole of carbanionic active species, into 300 ml of anhydrous THF containing 0.7 g of LiCl ($1.65.10^{-2}$ moles) previously vacuum dried. The mixture was reduced to a temperature of $-80°$ C. 11.3 g of tert-butyl acrylate in solution in THF were then added slowly. After completing addition of the monomer and polymerisation thereof, the terephthalaldehyde (0.1 g equivalent to $7.5.10^{-4}$ moles) were introduced dropwise into the reaction medium. This coupling agent (0.1 g in 40 ml THF) induced gelling of the medium during addition thereof. The medium was then brought up to ambient temperature; the polymer was neutralised by adding acidic methanol and then cold precipitated by means of a methanol-water mixture (90/10). The numeric molar mass of the polycondensate obtained was $\overline{M}n = 50\,000$ g/mole.

EXAMPLE 3

Synthesis of a Star Structure P(t-BuA) Obtained by Reacting a Living Poly(t-BuA) 1,3,5-triformylbenzene

[C$_6$H$_3$(1,3,5)(CHO)$_3$]

characteristics of synthesised
polymer ... $\overline{M}n = 10\,500$ g/mole 24 ml of a solution of diphenylhexyl lithium in THF at a concentration of $0.12.10^{-3}$ mole/ml, equivalent to $2.85.10^{-3}$ mole were introduced into 300 ml anhydrous THF containing 1.40 g of LiCl ($3.3.10^{-2}$ mole) previously vacuum dried. The medium was brought down to $-80°$ C.; 10 g tert-butyl acrylate ($7.8.10^{-2}$ moles) in solution in the THF were then introduced into the reaction medium.

After polymerisation of the monomer, triformylbenzene—in solution in THF—was added. The amount of triformylbenzene introduced was 0.154 g, equivalent to $9.5.10^{-4}$ moles, corresponding to a stoichiometric amount. The reaction medium was then brought up to ambient temperature and before cold precipitation with a cold methanol-water mixture (90/10), the polymer was neutralised by adding acidic methanol.

EXAMPLE 4

Synthesis of a Trisequenced P(MMA)—P(tBuA)—P(MMA) Copolymer Obtained by Coupling a Living P(MMA)—P(tBuA) Copolymer with Trephthalaldehyde characteristic of P(MMA)—P(tBuA)
copolymer precursor ... $\overline{M}n = 7\,000$ g/mole
characteristic of tri-sequenced
copolymer obtained
P(MMA)—P(tBuA)—P(MMA) ... $\overline{M}n = 14\,000$ g/mole 24 ml of a solution of diphenylhexyl lithium in THF at a concentration of $0.12.10^{-3}$ mole/ml, equivalent to $2.85.10^{-3}$ mole were introduced into 300 ml anhydrous THF containing 1.40 g of LiCl ($3.3.10^{-2}$ mole) previously vacuum dried. The medium was brought down to $-80°$ C.; 10 g of methyl methacrylate (0.1 mole) in solution in the THF were then introduced into the reaction medium. After this, 10 tertbutyl acrylate ($7.8.10^{-2}$ moles) in solution in the THF were added dropwise. On completion of polymerisation of this monomer, a stoichiometric amount of terephthalaldehyde solution in THF was added, equivalent to 0.19 g ($1,42.10^{-3}$ moles). The terephthalaldehyde was in solution in the THF in an amount of 0.1 g in 40 ml of THF. The reaction medium was then brought up to ambient temperature and before cold precipitation with a cold methanol-water mixture (90/10), the polymer was neutralised by adding acidic methanol.

EXAMPLE 5

Synthesis of a Multisequenced Copolymer of Structure

[PtBuA—PS—PtBuA]$_n$

Characteristics of precursor copolymer: $\overline{M}n$ of central sequence (PS)=20 000 g/mole; $\overline{M}n$ of outer sequences (PtBuA)=7 000 g/mole (each)

0.8 ml of a solution of naphthalene lithium in THF at $0.87.10^{-3}$ moles/ml, equivalent to $0.7.10^{-3}$ moles were introduced into 300 ml of anhydrous THF containing 0.7 g LiCl ($1.65.10^{-2}$ moles), previously vacuum dried. The medium was brought down to a temperature of $-90°$ C. 7 g of styrene ($6.71.10^{-2}$ moles) freshly distilled and diluted in THF was then added dropwise. A rapid disappearance of the characteristic green colour of the naphthalene lithium was observed, giving way to the red colour specific to styryl carbanions. After addition of the styrene had been completed, 0.2 g ($1.1.10^{-3}$ moles) of 1,1-diphenylethylene was added. After this step was completed, tert-butyl acrylate (5 g in solution in 40 ml of THF) was added to the reaction medium. The medium rapidly became clear. The terephthalaldehyde ($0.46.10^{-2}$ g, equivalent to $3.48.10^{-4}$ moles) in solution in THF was then added; 18.6 ml of a solution comprising 40 ml of THF containing 0.1 g terephthalaldehyde. The viscosity of the reaction medium rapidly increased. It is important to add the stoichiometric amount of terephthalaldehyde before the medium gels. The medium was brought up to ambient temperature; introducing acidic methanol destroyed the physical gel resulting from associations between alcoholate functions, rendering the medium perfectly soluble. The copolymer was recovered by cold precipitation using a methanol-water mixture (90/10). The numeric molar mass molar of the multisequenced copolymer was equal to $\overline{M}n=125\,000$ g/mole.

EXAMPLE 6

Synthesis of a Multisequenced Copolymer of Structure [PtBuA—PMMA—PtBuA]

Characteristics of precursor copolymer: $\overline{M}n$ of (PMMA) sequence=8 000 g/mole; $\overline{M}n$ of outer sequences=9 000 g/mole (each)

3.4 ml of a solution of 1,1,4,4-tetraphenyldilithiobutane in THF at $0.44.10^{-3}$ moles/ml, equivalent to $1.5.10^{-3}$ moles of carbanionic active species was introduced into 300 ml of anhydrous THF containing 0.7 g of LiCl ($1.65.10^{-2}$ moles), previously vacuum dried. The medium was brought down to a temperature of $-80°$ C. 6 6 g of methyl methacrylate ($6.10^{-2}$ moles) freshly distilled and diluted in THF were then added dropwise. There was rapid disappearance of the characteristic red color of the diphenylethylene carbanion. When addition of MMA was completed, t-butyl acrylate (13.5 g equivalent to $0.10^{-5}$ moles) was introduced. When this step was completed, the terephthalaldehyde (0.1 g equivalent to $7.5.10^{-4}$ moles) was added. This coupling agent was in solution in THF (0.4 g in 40 ml of THF). The same phenomena (increase in viscosity and gelling of the medium) as those described in the previous examples were observed. After having brought the reaction medium back to ambient temperature and acidified it, the copolymer was recovered by cold precipitation with an methanol-water mixture (90/10). The numeric molar mass of the multisequenced copolymer obtained was equal to $\overline{M}n=110\,000$ g/mole.

I claim:
1. A process for coupling a living polymer comprising living terminal (meth)acrylic units, which process comprises the steps of:
    (i) anionically polymerizing with an initiator system consisting of a functional initiator and a ligand to obtain a living polymer comprising living terminal (meth)acrylic units;
    (ii) reacting the living polymer with an aldehyde compound of formula:

R—(CHO)$_r$ in which $r \geq 2$; R is an alkyl, cycloalkyl, aryl, or aralkyl group having from 2 to 24 carbon atoms, unsubstituted or substituted by at least one substituent comprising a $C_{1-6}$ alkoxy or di($C_{1-6}$alkyl)amino, halogen, or trifluoromethyl; and
    (iii) recovering the final polycondensate.

2. The process according to claim 1, wherein said polymer comprises monomer units selected from the group consisting of acrylic, methacrylic, vinylaromatic, dienic, vinylpyridine, alkylene oxide, lactame, lactone and maleimide monomers.

3. The process according to claim 1, wherein step (i) comprises:
    (i) (a) anionically polymerizing a monomer A selected from the group consisting of (meth)acrylic, vinylaromatic, dienic, vinylpyridine, alkylene oxide, lactame, lactone and maleimide monomers, using an initiator system consisting of at least one monofunctional initiator and at least one ligand leading to the living polymer $(A)_a^-$, with $a \leq 5,000$;
    (b) reacting said living polymer $(A)_a^-$ with a monomer B different from A, wherein B is selected from the group consisting of (meth)acrylic, vinylaromatic, dienic, vinylpyridine, alkylene oxide, lactame, lactone and maleimide monomers, in the presence of at least one ligand as defined above, leading to the polymer $(A)_a—(B)_b^-$, $b \leq 5,000$;
    (c) reacting said living $(A)_a—(B)_b^-$ copolymer with a monomer C different from B, wherein C is selected from the group consisting of (meth)acrylic, vinylaromatic, dienic, vinylpyridine, alkylene oxide, lactame, lactone and maleimide monomers, in the presence of at least one ligand as defined above, leading to the living tri-sequenced copolymer $(A)_a—(B)_b—(C)_c^-$, $c \leq 5,000$;
    (k) reacting said $(A)_a—(B)_b—(C)_c—\ldots—(J)_j^{-0}$ copolymer with a monomer K different from J, wherein K is selected from the group consisting of (meth)acrylic, vinylaromatic, dienic, vinylpyridine, alkylene oxide, lactame, lactone and maleimide monomers, in the presence of at least one ligand as defined above, leading to the living tri-sequenced copolymer $(A)_a—(B)_b—(C)_c \ldots —(K)_k^-$, with $k \leq 5,000$;
    and finally reacting the living polymer obtained from the previous step with a (meth)acrylic monomer in the presence of at least one ligand leading to a living polymer $P^{31}$.

4. The process according to claim 1, wherein step (i) comprises:
    (i) (a) anionically polymerizing a monomer A selected from the group consisting of (meth)acrylic, vinylaromatic, dienic, vinylpyridine, alkylene oxide, lactame, lactone and maleimide monomers, using an initiator system consisting of at least one monofunctional initiator and at least one ligand leading to the living polymer $(A)_a^-$, with $a \leq 5,000$;

(b) reacting said living polymer $(A)_a^-$ with a monomer B different from A, wherein B is selected from the group consisting of (meth)acrylic, vinylaromatic, dienic, vinylpyridine, alkylene oxide, lactame, lactone and maleimide monomers, in the presence of at least one ligand as defined above, leading to the polymer $(A)_a-(B)_b^-$, $b \leq 5,000$;

(c) reacting said living $(A)_a-(B)_b^-$ polymer with a (meth)acrylic monomer C different from B, in the presence of at least one ligand as defined above, leading to the living tri-sequenced copolymer $(A)_a-(B)_b-(C)_c^-$, $c \leq 5,000$.

5. The process according to claim 4, wherein A is a vinylaromatic monomer, B is a vinylpyridine monomer, and C is a methacrylate monomer.

6. The process according to claim 4, wherein the molecular weights of sequences $(A)_a$, $(B)_b$ and $(C)_c$ are between 1,000 and 500,000.

7. The process according to claim 6, wherein the molecular weights of sequences $(A)_a$, $(B)_b$ and $(C)_c$ are between 2,000 and 300,000.

8. The process according to claim 4, wherein the weight ratio of sequences $(A)_a/(B)_b/(C)_c$ is between 1/500/500 and 500/1/1.

9. The process according to claim 8, wherein the weight ratio of sequences $(A)_a/(B)_b/(C)_c$ is between 1/100/100 and 100/1/1.

10. The process according to claim 1, wherein step (i) comprises:

(i) (a) anionically polymerizing a monomer A selected from the group consisting of (meth)acrylic, vinylaromatic, dienic, vinylpyridine, alkylene oxide, lactame, lactone and maleimide monomers, using an initiator system consisting of at least one monofunctional initiator and at least one ligand leading to the living polymer $(A)_a^-$, with $a \leq 5,000$;

(b) reacting said living polymer $(A)_a^-$ with a monomer B different from A, in the presence of at least one ligand as defined above, leading to the polymer $(A)_a-(B)_b^-$, with $b \leq 5,000$.

11. The process according to claim 10, wherein A is a vinylaromatic monomer and B is a methacrylate monomer.

12. The process according to claim 10, wherein the molecular weights of sequences $(A)_a$ and $(B)_b$ are between 1,000 and 500,000.

13. The process according to claim 12, wherein the molecular weights of sequences $(A)_a$ and $(B)_b$ are between 2,000 and 300,000.

14. The process according to claim 10, wherein the weight ratio of sequences $(A)_a/(B)_b$ is between 1/500 and 500/1.

15. The process according to claim 14, wherein the weight ratio of sequences $(A)_a/(B)_b$ is between 1/99 and 99/1.

16. The process according to claim 1, wherein step (i) comprises:

(i) anionically polymerizing a (meth)acrylic monomer A using an initiator system comprising at least one monofunctional initiator and at least one ligand leading to the living polymer $(A)_a^{31}$, with a $\leq 5,000$.

17. The process according to claim 16, wherein monomer A is methyl methacrylate or tert-butyl acrylate.

18. The process according to claim 16, wherein the molecular weights of sequences $(A)_a$ between 1,000 and 500,000.

19. The process according to claim 18, wherein the molecular weights of sequences $(A)_a$ between 2,000 and 300,000.

20. The process according to claim 1, wherein R is an aryl group, which is unsubstituted or substituted by 1 to 4 groups selected from the group consisting of $C_{1-4}$ alkyls, trifluoromethyl and halogens.

21. The process according to claim 1, wherein said aldehyde compound is bi-functional, with r equal to 2.

22. The process according to claim 20, wherein said aldehyde compound is terephthalaldehyde.

23. The process according to claim 1, wherein said aldehyde compound is multifunctional, with r greater than 2.

24. The process according to claim 22, wherein said aldehyde compound is 1,3,5-triformylbenzene.

25. The process according to claim 1, wherein the functional initiator is a monofunctional initiator and the di- or multi-functional aldehyde is introduced in an amount sufficient to obtain an aldehyde/monofunctional initiator ratio in the range of 0.2 to 10.

26. The process according to claim 25, wherein the functional initiator is a monofunctional initiator and the di- or multi-functional aldehyde is introduced in an amount sufficient to obtain an aldehyde/monofunctional initiator ratio in the range of 0.5 to 1.

27. The process according to claim 26, wherein said aldehyde compound is introduced substantially in a stoichiometric amount with respect to said mono-functional initiator.

28. The process according to claim 1, wherein the ligand/mono-functional initiator ratio is in the range of 0.3 to 50.

29. The process according to claim 28, wherein the ligand/mono-functional initiator ratio is about 5.

30. The process according to claim 1, wherein the functional initiator employed in the first polymerization step (i) of the process is a mono-functional initiator and is a compound of the formula:

(R')—M wherein M is an alkaline or alkaline-earth metal of a valency of 1 and R' is a straight chain or branched alkyl radical having 2 to 6 carbon atoms, a substituted aryl radical, or an alkyl radical having 1 to 6 carbon atoms which is substituted by at least one phenyl group; or a compound of the formula:

$(C_6H_5)_2CHM'$ wherein M' is selected from lithium, sodium and potassium.

31. The process according to claim 30, wherein said monofunctional initiator is selected from the group consisting of sec.-butyllithium, n-butyllithium, fluorenyllithium, alphamethylstyryllithium, 1,1-diphenylhexyllithium (DPHLi), diphenylmethyl-lithium or -sodium or -potassium and 1,1-diphenyl-3-methylpentyllithium.

32. The process according to claim 31, wherein the monofunctional initiator is DPHLi.

33. The process according to claim 1, wherein said ligand comprises
   alkaline or alkaline-earth mineral salts selected from the group consisting of chlorides, fluorides, bromides, iodides, borides, sulfates, nitrates and borates, or
   alkaline metal organic salts selected from the group consisting of alcoholates, carboxylic acid esters substituted in the alpha position by said metal, and salts in which said alkaline is associated with a group comprising:
   (A) groups of the formula:

$$-O-\underset{\underset{O}{\|}}{C}-R_1 \qquad (II)$$

wherein $R_1$ is a straight chain or alkyl radical with 1 to 20 carbon atoms, a cycloalkyl radical with 3 to 20 carbon atoms, or an aryl radical with 6 to 14 carbon atoms;
   (B) groups of the formula:

$$-O-\underset{\underset{O}{\|}}{C}\text{\textendash}(CYZ)_n\text{\textendash}CH_mX_{3-m} \qquad (III)$$

wherein Y and Z are the same or different, and comprise a hydrogen or halogen atom; n is an integer from 0 to 4; X is a halogen atom; and m is an integer from 0 to 2;
   (C) groups of the formula:

$$-O-SO_2-CT_3$$

wherein T comprises a hydrogen or halogen atom; or
   (D) groups of the formula:

$$-B(R_2)_4$$

wherein $R_2$ comprises hydrogen, or an alkyl or aryl radical.

34. The process according to claim 33, wherein said ligand comprises:
   (i) acetate, propionate or benzoate groups for formula (II);
   (ii) α-bromoacetate or trifluoroacetate groups for formula (III);
   (iii) trifluoromethanesulfonic or methane-sulfonic groups for formula (IV); or
   (iv) borohydrate or tetraphenylborate groups for formula (V).

35. The process according to claim 1, wherein said ligand comprises a nonnitrogenous macrocyclic complexing agent, which complexing agent is selected from the group consisting of cyclic polyethers and polythioethers.

36. The process according to claim 35, wherein said ligand is a macrocyclic poly(thio)ether with a macrocyclic ring having at least 14 carbon atoms and oxygen, wherein each oxygen atom of the ring is separated from the other oxygen atoms of the ring by two or three carbon atoms.

37. The process according to claim 33, wherein said ligand is LiCl.

38. The process according to claim 1, wherein the reactions of steps (i) and (ii) are carried out in the presence of a solvent, wherein said solvent is an aromatic solvent selected from benzene and toluene, tetrahydrofuran (THF), diglyme, tetraglyme, orthoterphenyl, biphenyl, decaline, tetraline or dimethylformamide.

39. The process according to claim 38, wherein said solvent is THF or toluene.

40. The process according to claim 1, wherein the reaction temperature of steps (i) and (ii) is between about −100° C. and 60° C.

41. The process according to claim 1, wherein the reaction temperature of steps (i) and (ii) is between about −80° C. and 20° C.

42. The process according to claim 1, wherein the reactions of steps (i) and (ii) of the process are carried out in a non-oxidizing, anhydrous and aprotic medium.

43. The process according to claim 1, wherein the total amount of said aldehyde compound is added before gelation of the medium.

44. The process according to claim 1, wherein said aldehyde compound is introduced dropwise.

45. The process according to claim 1, wherein the medium is acidified before separation, using an acid selected from the group consisting of hydrochloric, sulfuric, acetic, para- or methane-toluenesulfonic acids, and mixtures thereof.

46. The process according to claim 1, wherein the blocks representing an acrylic and/or methacrylic monomer sequence are totally or partially hydrolysed to the corresponding acrylic and/or methacrylic acid sequence.

47. The process according to claim 46, wherein said corresponding acrylic and/or methacrylic acid sequence is subsequently totally or partially saponified with an alkaline or alkaline-earth metal salt to a corresponding alkaline or alkaline-earth acrylate and/or methacrylate sequence.

48. The process according to claim 1, wherein the blocks representing an acrylic and/or methacrylic monomer sequence are totally or partially transesterified to a sequence of another acrylic and/or methacrylic monomer to replace tertiary (meth)acrylate by a secondary (meth)acrylate or vice-versa, a secondary (meth)acrylate by a primary (meth)acrylate or vice-versa, a tertiary (meth)acrylate by a primary (meth)acrylate or vice-versa.

49. A polycondensate obtained by the process of claim 1.

50. A process for coupling a living polymer comprising living terminal (meth)acrylic units, which process comprises the steps of:
   (i) anionically polymerizing with an initiator system consisting of a monofunctional initiator and a ligand to obtain a living polymer comprising living terminal (meth)acrylic units;
   (ii) reacting the living polymer with an aldehyde compound of formula:

$$R-(CHO)_r$$

in which $r \geq 2$; R is an alkyl, cycloalkyl, aryl, or aralkyl group having from 2 to 24 carbon atoms, unsubstituted or substituted by at least one substituent comprising a $C_{1-6}$ alkoxy or di($C_{1-6}$alkyl)amino, halogen, or trifluoromethyl; and
   (iii) recovering the final polycondensate.

* * * * *